June 25, 1968     A. W. LAKE     3,389,696
BARBEQUE STRUCTURE AND MOUNTING MEANS
Filed Nov. 14, 1966     2 Sheets-Sheet 1
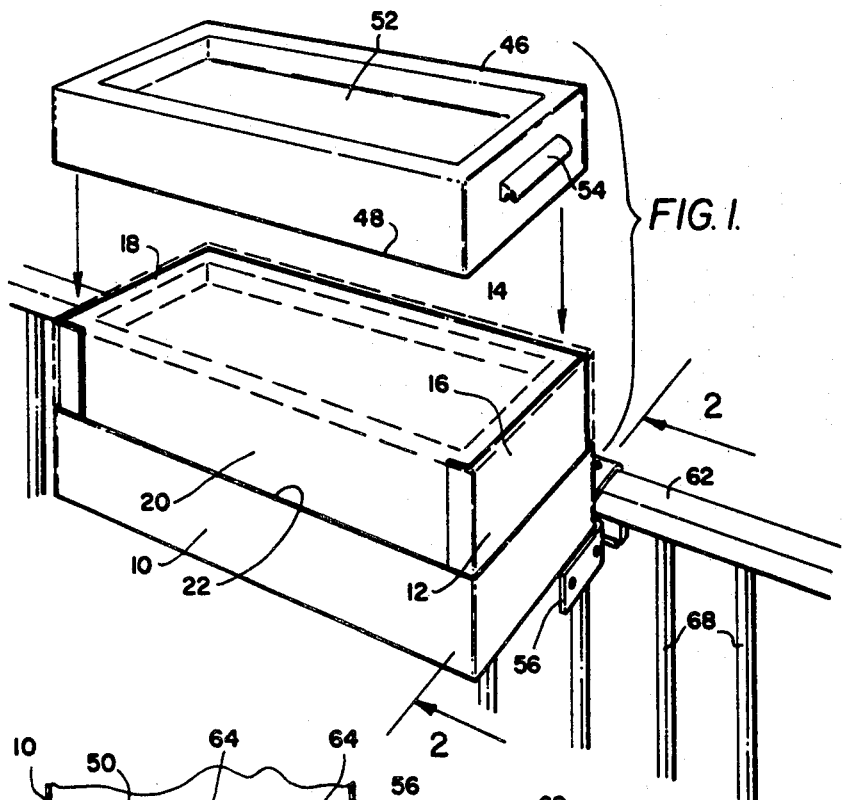
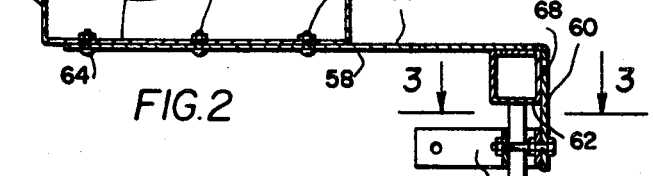
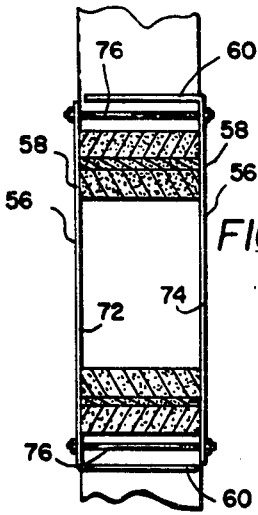 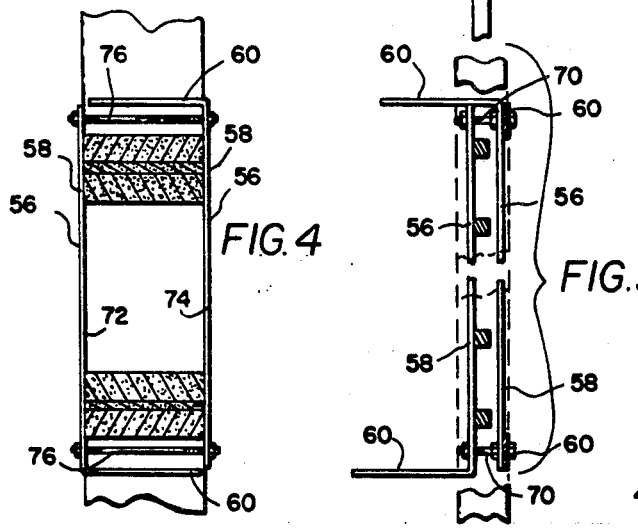
INVENTOR.
ABRAHAM W. LAKE
BY
Wm. H. Dean June 25, 1968 A. W. LAKE 3,389,696
BARBEQUE STRUCTURE AND MOUNTING MEANS
Filed Nov. 14, 1966 2 Sheets-Sheet 2
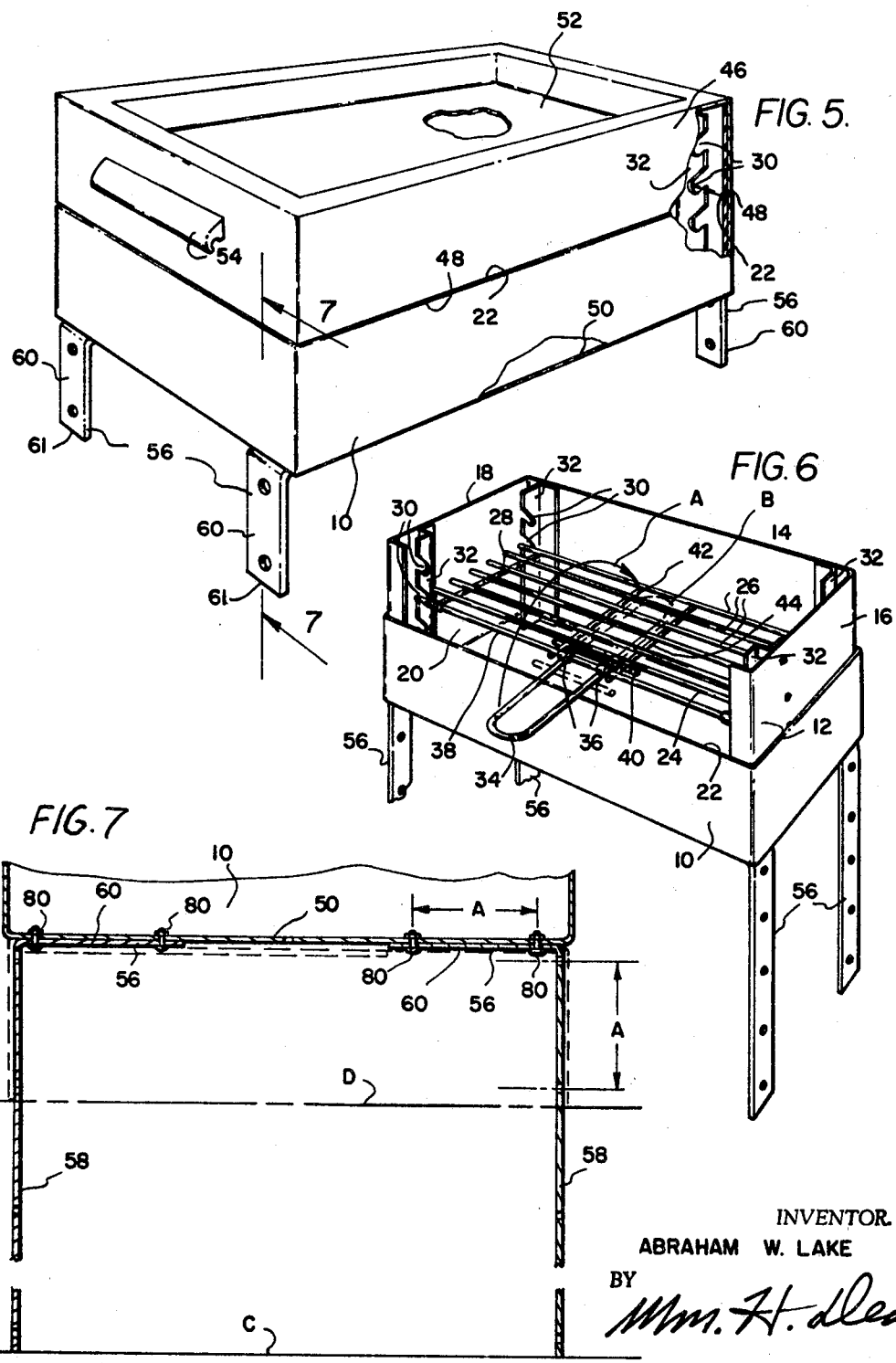
INVENTOR.
ABRAHAM W. LAKE
BY Wm. H. Dean

United States Patent Office 3,389,696
Patented June 25, 1968

3,389,696
BARBEQUE STRUCTURE AND
MOUNTING MEANS
Abraham W. Lake, Scottsdale, Ariz.
(235 Broadway, San Diego, Calif. 92101)
Filed Nov. 14, 1966, Ser. No. 593,877
5 Claims. (Cl. 126—25)

This invention relates to a barbeque structure and mounting means, and more particularly, to a barbeque structure and mounting means which may be installed in various locations and positions for the purpose of barbecuing various foods, as desired.

Barbeque structures are generally used to contain charcoal or other combustion media for the purpose of barbecuing meats and other foods, and these barbeque structures may be used in various locations, preferably out of doors in patio areas, porches, or other relatively open areas.

In many instances, limited space may be available to persons living in apartments and similar areas, such that the conveniences of barbeque cooking are limited.

Accordingly, it is an object of the present invention to provide a novel barbeque structure and mounting means having leg structures which readily adapt the mounting of the barbeque structure to the railing of porches, upper edges of walls, fences of various construction, or other similar structures; said legs also being readily adaptable to support the barbeque structure of the invention on the ground or on a horizontal floor.

Another object of the invention is to provide a novel barbeque structure having novel mounting means and cover structure, which provides for convenient mounting of the barbeque structure in various areas, and for the covering of such barbeque structure to prevent scattering of ashes, or the like.

Another object of the invention is to provide a novel barbeque structure having a cover for the grill and fire box thereof; the cover being provided with a recess in its uppermost portion to contain ornamental objects, such as flowers, or the like, when the barbeque is not in use, and when the cover is used to enclose the fire box and grill thereof.

Another object of the invention is to provide a novel barbeque structure and mounting means, particularly adapted for mounting a barbeque structure of the invention in cantilever overhanging position outwardly of a railing or wall structure so as to extend the usual area of limited living quarters, and yet provide convenient barbeque facility.

Another object of the invention is to provide a novel barbeque structure and mounting means which is readily convertible from a barbeque structure to a planter, such that the barbeque or planter may be conveniently mounted in overhanging position outwardly of the upper edges of walls or railings in compatible relationship with limited space and to provide for alternate use of the barbequing facilities and the aesthetics of a flower planter, or the like.

Further objects and advantages of the invention may be apparent from the following specification, appended claims, and accompanying drawings, in which:

FIG. 1 is a perspective view of the barbeque structure and mounting means of the invention, showing the same mounted on a porch railing, or the like, and illustrating a planter box cover for the barbeque in an exploded view relationship to the barbeque structure of the invention;

FIG. 2 is a fragmentary vertical sectional view taken from the line 2—2 of FIG. 1;

FIG. 3 is a fragmentary plan sectional view taken from the line 3—3 of FIG. 2;

FIG. 4 is a plan sectional view similar to FIG. 3, but showing the mounting means of the invention on a masonry wall structure, as distinguished from the steel railing disclosed in FIGS. 1, 2 and 3;

FIG. 5 is a perspective view of the barbeque structure and mounting means of the invention, disposed to be supported on a horizontal surface, and illustrating the barbeque structure cover in position thereon;

FIG. 6 is another perspective view of the barbeque structure of the invention, and the mounting means for support of the barbeque structure on a horizontal surface, and illustrating the cover of the barbeque structure removed, such that the barbeque structure may be used for barbequing purposes; and FIG. 7 is a vertical sectional view taken from the line 7—7 of FIG. 5, and showing varying positions of the mounting or leg structure of the barbeque structure of the invention for supporting the barbeque structure at various vertical levels from a horizontal surface, such as a floor, counter, or the like.

As shown in FIG. 1 of the drawings, the barbeque structure of the invention comprises a box-like fire box 10 having an upstanding grill supporting frame 12 provided with a back wall 14 and end walls 16 and 18, which extend above the fire box 10 providing an open side 20 above the upper edge 22 of the fire box; said open side 20 being best illustrated in FIG. 6, this open side providing access to a grill 24 which comprises a plurality of horizontally disposed spaced bars 26 interconnected by horizontal bars 28. Opposite ends of the bars 26 being adjustably mounted in superimposed notched portions 30 of corner posts 32 secured to the end walls 16 and 18, and the back wall 14 of the grill frame 12. A handle 34 is provided for the grill 24 and is provided with a pair of pivotal bearings 36 pivoted on a foremost member 38 of the bars 26. This handle, as indicated by an arrow A is pivotal into a broken line position B on top of the bars 26 for storage, and the handle is extended outward, as indicated by solid lines in FIG. 6, for use in handling the grill 24, and raising or lowering it with respect to the notches 30.

The handle 34 is provided with a cross bar 40 disposed beyond the pivotal bearings 36 to bear on the lower side of bars 42 and 44 which are secured transversely on the grill bars 26. Thus, the handle 34 operates as a cantilever support for handling the grill 24, when it is desired to adjust it with respect to the notches 30, as hereinbefore described.

The barbeque structure of the invention is provided with a box-like cover 46 which is an inverted box-like cover adapted to fit over and around the grill frame 12 above the fire box 10. The cover 46 is provided with a lower peripheral edge 48 adapted to rest on the upper edge 22 of the fire box 10 to provide a tight enclosure for the upper open area of the fire box 10 and to enclose the grill 24 particularly at the front open side of the grill frame 12. The fire box 10 is provided with a bottom 50 adapted to support charcoal, or the like, below the grill 24, and the cover is provided with recessed top 52 which may be recessed any substantial amount, as for example, two inches or more, wherein artificial flowers or planted flowers may be retained or other ornamental means may be carried or the recess 52 may be unused, if desired. However, the cover 46 fully encloses the area of the grill 24 and the upper open portion of the fire box 10.

Opposite ends of the cover 46 are provided with handles 54 for use in handling the cover for removing and replacing it, as desired. Inasmuch as the inverted box-shaped cover 46 closely fits the upwardly extending side walls 14, 16 and 18 of the grill frame 12, it is precisely located thereon, such that the upper edge 22 of the fire box 10 is intimately engaged by the lower edge 48 of the cover 46.

The mounting means for the barbeque structure of the invention, comprises four L-shaped straps designated 56. These straps 56 are each provided with a long leg 58 and a short leg 60, as shown best in FIG. 3 of the drawings. As shown in FIGS. 1 to 4 of the drawings, the barbeque structure of the invention is mounted on a railing 62, which may be a railing around a porch or patio or adjacent an overhead walkway. In this installation, a pair of the members 56 are bolted to the bottom 50 of the fire box 10 by means of bolts 64. Thus, two of the members 58 are secured to the bottom of the fire box 10 by the bolts 64 with the long legs 58 disposed horizontally, and the relatively short legs 60 disposed vertically at an inner side 68 of the rail 62. Another pair of the members 56, as shown in FIG. 3, are clamped in opposed relationship to each other at inner and outer sides of the rail structure 62, and particularly vertical bars 68 thereof. These members 56, as shown in FIG. 3, are clamped together at opposite sides, particularly inner and outer sides of the railing structure by means of bolts 70, and these bolts 70 also pass through lower ends of the portion 60 of the pair of members 56 which are secured by the bolts 64 to the bottom 50 of the fire box 10. Thus, the four mounting members 56 are used in the railing installation for the barbeque structure of the invention. Likewise, as shown in FIG. 4, the members 56 are engaged with opposite edges 72 and 74 of a masonry wall and are clamped thereto by means of relatively longer bolts 76 installed similarly to that as shown in FIG. 3 of the drawings.

When the mounting members 56 are used, as shown in FIG. 4 of the drawings, the long legs 58 are bolted to the bottom 50 of the fire box 10 and the short leg portions 60 extend downwardly so that their lower ends 61 may rest on a horizontal surface and support the fire box structure 10, at relatively low elevation.

As shown in FIG. 7 of the drawings, the long legs 58 may project downwardly from the fire box 10 and the short legs 60 may be secured by bolts 80 to the bottom 50 of the fire box 10.

Holes in the legs 58 and 60 are spaced equally so that the various bolts which extend through the bottom of the fire box 10 will match the holes in the different legs 58 and 60.

When the long legs 58 are extended downwardly, the fire box 10, as shown in FIG. 7, is mounted at a considerably higher elevation with respect to the horizontal surface, designated C in FIG. 7, than would be the case if the short legs 60 were to support the fire box at a level D in a position, as indicated in FIG. 5.

It will be obvious to those skilled in the art that the fire box 10 and barbeque structure of the invention may be mounted on the upper portion of the railing 62 which may surround a patio, a walkway or a porch or which may extend therealong, and that the cover 46 may readily enclose the upper open portion of the fire box and surround the rail supporting frame 12 to prevent ashes and other material from escaping from the fire box during windy weather, and further, that the cover with its recess 52 provides a means for supporting aesthetic articles, such as plants or other such items to provide an aesthetic effect, when the barbeque structure of the invention is not in use.

Further, as shown in FIGS. 5, 6 and 7, it will be seen that the same L-shaped mounting members may be used as legs to support the barbeque on a horizontal surface in contrast to the cantilever supports of the barbeque structure of the invention, as illustrated in FIGS. 1 to 4 of the drawings.

It will be obvious to those skilled in the art that various modifications of the invention may be resorted to in a manner limited only by a just interpretation of the following claims.

I claim:

1. In a barbeque structure and mounting means, the combination of: a box-shaped fire box having an upper open portion; a grill frame positioned in said fire box and having three walls extending upwardly therein to an elevation above the upper open edge of the fire box; a barbeque grill supported in said frame; means for adjustably supporting said grill at various elevated positions in said grill frame; and an inverted box-shaped cover adapted to fit over said grill frame, said inverted box-shaped cover having a lower open end and surrounding edges; said fire box having an upper open end and surrounding edges adapted to support the lower edges of said inverted box-shaped cover to provide a tight enclosure of said fire box and said grill and grill frame.

2. The invention, as defined in claim 1, wherein: four L-shaped mounting members are secured to said fire box.

3. The invention, as defined in claim 2, wherein: two of said L-shaped members are disposed horizontally in bolted relationship to the bottom of said fire box, and having legs extending vertically; and another pair of said L-shaped members are secured together in spaced relationship to each other and adapted to be clamped on opposite sides of the railing, and means securing said first mentioned L-shaped members over the top of said rail and to said second pair of L-shaped members connected to opposite sides of said railing.

4. The invention, as defined in claim 1, wherein: four L-shaped members are bolted to the bottom of said fire box, and horizontally disposed portions of said L-shaped members are secured in horizontal position in engagement with the bottom of said fire box and the remaining legs are disposed vertically near the corners of said fire box to support the same on a horizontally disposed surface.

5. The invention, as defined in claim 1, wherein: said cover is provided with a recessed portion adapted to support ornamental elements, when said cover is disposed over said grill frame and enclosing said fire box.

References Cited

UNITED STATES PATENTS

| | | | |
|---|---|---|---|
| 2,818,316 | 12/1957 | D'Andrade | 311—22 |
| 3,119,387 | 1/1964 | Beller | 126—25 |
| 3,244,163 | 4/1966 | McGloughlin | 126—25 |

FREDERICK KETTERER, *Primary Examiner.*